(12) United States Patent
Caprio

(10) Patent No.: US 11,333,495 B1
(45) Date of Patent: May 17, 2022

(54) LEVEL APPARATUS FOR DETERMINING SLOPE IN TWO DIMENSIONS

(71) Applicant: DM Consulting Inc., Monroe Township, NJ (US)

(72) Inventor: Michael Angelo Caprio, Monroe Township, NJ (US)

(73) Assignee: DM CONSULTING INC., Monroe Township, NJ (US)

( * ) Notice: Subject to any disclaimer, the term of this patent is extended or adjusted under 35 U.S.C. 154(b) by 0 days.

(21) Appl. No.: 17/394,310

(22) Filed: Aug. 4, 2021

Related U.S. Application Data

(63) Continuation of application No. PCT/US2021/038634, filed on Jun. 23, 2021.
(Continued)

(51) Int. Cl.
*G01C 9/28* (2006.01)
*A63B 67/06* (2006.01)
*A63B 63/08* (2006.01)

(52) U.S. Cl.
CPC ............... *G01C 9/28* (2013.01); *A63B 63/08* (2013.01); *A63B 67/06* (2013.01); *A63B 2067/063* (2013.01); *A63B 2225/02* (2013.01)

(58) Field of Classification Search
CPC ........... G01C 9/28; A63B 63/08; A63B 67/06; A63B 2067/063; A63B 2225/02
See application file for complete search history.

(56) References Cited

U.S. PATENT DOCUMENTS 101,773 A * 4/1870 Sharp ............... G01B 3/1084
                                                    7/164
1,113,805 A * 10/1914 McNeil ............... G01C 9/12
                                                    33/354
(Continued)

FOREIGN PATENT DOCUMENTS

CN      201335691 Y    10/2009
JP       3046585 B2     5/2000
(Continued)

OTHER PUBLICATIONS

Crybaby Cornhole, World's First Cornhole Board Stabilizer, retrieved from https://crybabycornhole.com, Jan. 4, 2021, pp. 1-7.
(Continued)

*Primary Examiner* — Yaritza Guadalupe-McCall
*Assistant Examiner* — Tania Courson
(74) *Attorney, Agent, or Firm* — Hard IP LLC

(57) ABSTRACT

Described implementations provide a level for measuring a level of a target surface. The level has a base structure having a bottom surface, a top surface, a rear surface, and a front surface, and a bubble level disposed on the top surface of the base structure. The bottom surface is disposed at (1) a desired slope angle of the target surface along a first axis, and (2) a predetermined pitch angle along a second axis of the base structure, the second axis perpendicular to the first axis. The bubble level is disposed on the top surface along the first axis to indicate a slope level of the target surface relative to the predetermined slope angle and along the second axis to indicate a pitch level of the target surface relative to the predetermined pitch angle. The base structure has a ledge extending in an engagement direction along a third axis.

14 Claims, 15 Drawing Sheets

Related U.S. Application Data

(60) Provisional application No. 63/133,709, filed on Jan. 4, 2021.

(56) References Cited

U.S. PATENT DOCUMENTS

| | | | | |
|---|---|---|---|---|
| 1,305,636 | A * | 6/1919 | Weilep | G01C 9/24 33/375 |
| 1,417,703 | A * | 5/1922 | Waffenschmidt | E01B 35/00 33/501 |
| 2,268,758 | A * | 1/1942 | Martin | G01B 3/02 33/227 |
| 2,689,412 | A * | 9/1954 | Young | G01C 9/26 269/19 |
| 2,743,528 | A * | 5/1956 | Posthauer, Sr. | G01C 9/24 33/375 |
| 3,408,741 | A * | 11/1968 | Bane | G01C 15/00 33/284 |
| 3,568,319 | A * | 3/1971 | Moll | B25H 7/04 33/340 |
| 3,751,818 | A * | 8/1973 | Eller, Jr. | G01C 7/00 33/375 |
| 3,894,342 | A | 7/1975 | Goode | |
| 3,950,860 | A * | 4/1976 | Holcombe | G01C 9/28 33/371 |
| 4,438,538 | A * | 3/1984 | Larsen | B44D 3/38 7/164 |
| 4,860,459 | A | 8/1989 | Dengler | |
| 5,020,235 | A * | 6/1991 | Martin | G01B 3/1071 33/668 |
| 5,119,565 | A * | 6/1992 | Horvath | G01C 9/28 33/405 |
| 5,596,826 | A | 1/1997 | Barden | |
| 5,878,502 | A * | 3/1999 | Donahue, Jr. | G01C 9/26 33/374 |
| 6,141,880 | A * | 11/2000 | Vircks | A63C 19/06 33/1 G |
| 6,338,204 | B1 * | 1/2002 | Howle | G01B 3/1003 33/758 |
| 6,490,803 | B1 * | 12/2002 | Butters | E04G 21/1833 33/1 LE |
| 6,748,665 | B1 * | 6/2004 | Samp | G01C 9/32 33/348.2 |
| 6,964,109 | B1 * | 11/2005 | Bond | B44D 3/38 33/1 LE |
| 7,047,659 | B2 * | 5/2006 | Holland | G01B 3/1084 33/760 |
| 7,171,759 | B1 * | 2/2007 | Loen | G01B 5/25 33/1 N |
| 7,987,608 | B2 | 8/2011 | Rowe | |
| 8,006,396 | B2 * | 8/2011 | Ilton | G01C 9/26 33/301 |
| 8,222,893 | B2 * | 7/2012 | Holfeld | B61K 9/10 324/207.2 |
| 8,413,343 | B2 * | 4/2013 | Hale | G01C 15/10 33/375 |
| 8,732,968 | B2 * | 5/2014 | Kang | G01C 17/16 33/1 E |
| 8,806,769 | B2 | 8/2014 | Tan | |
| 9,052,191 | B1 | 6/2015 | Keate | |
| 9,222,774 | B2 * | 12/2015 | Han | G01C 17/02 |
| 9,528,827 | B2 * | 12/2016 | Carniato | G01C 9/26 |
| 9,625,259 | B2 * | 4/2017 | Ryoo | G01C 9/10 |
| 9,851,203 | B2 * | 12/2017 | Heerschap | G01C 17/16 |
| D811,907 | S | 3/2018 | McLaughlin | |
| 10,054,440 | B2 * | 8/2018 | Egan | E04G 21/00 |
| 2008/0042360 | A1 * | 2/2008 | Veikley | A63B 67/06 273/398 |
| 2011/0010954 | A1 | 1/2011 | Rowe | |
| 2016/0082334 | A1 * | 3/2016 | Olive | A63B 63/00 108/19 |
| 2017/0292837 | A1 | 10/2017 | Jones | |

FOREIGN PATENT DOCUMENTS

| | | |
|---|---|---|
| RU | 172142 U1 | 6/2017 |
| WO | 2010067371 A1 | 6/2010 |

OTHER PUBLICATIONS

Pro Board Level Facebook, retrieved from https://www.facebook.com/Pro-Board-Level-106268098338559, Jul. 15, 2021, pp. 1-6.
International Application No. PCT/US 2021/038634, International Search Report and Written Opinion dated Oct. 7, 2021, 8 pages.

\* cited by examiner

LEVEL APPARATUS FOR DETERMINING SLOPE IN TWO DIMENSIONS

CROSS-REFERENCE TO RELATED APPLICATIONS

This application is a bypass continuation of international patent application no. PCT/US2021/038634, filed on Jun. 23, 2021, which claims the benefit under 35 U.S.C. § 119(e) of the filing date of U.S. provisional application No. 63/133, 709 filed on Jan. 4, 2021, the contents of both of which are incorporated herein by reference in their entirety.

BACKGROUND

Various types of leveling devices are known. For example, a bubble level or spirit level is an instrument used for determining an angular deviation of a surface from a defined angle (e.g., to determine that a surface is horizontally "flat", vertically "square", etc.). A typical bubble level includes an elongated body with at least one flat edge and one or more sealed vials containing an entrapped air bubble floating in a liquid. The vials are disposed at desired angles in relation to the at least one flat edge of the level body. The position of the bubble in the liquid vial varies as the angular disposition of the flat edge of the level body varies, thereby measuring an angular deviation between a surface against which the flat edge of the level is placed, and the angle of each given vial.

Levels are advantageously employed in numerous fields such as carpentry, construction, manufacturing, and gaming. For example, it may be desirable that a gaming table or surface be flat, so as not to provide (dis)vantages to players on a given side of the gaming surface. In some instances, a surface may need to be leveled in two dimensions simultaneously. This may be a time-consuming process, as a user may need to orient a typical level in the first dimension, iteratively adjust the level until the bubble floats to the level indication, and then repeat this process in the second dimension. Thus, an improved level apparatus is needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described implementations provide a level apparatus for measuring a level of a target surface. The level apparatus has a base structure having a bottom surface, a top surface, a rear surface, and a front surface, and at least one bubble level disposed on the top surface of the base structure. The bottom surface is disposed at a predetermined slope angle along a first axis of the base structure, the predetermined slope angle associated with a desired slope angle of the target surface along the first axis, such that in response to the target surface being disposed at the predetermined slope angle, the top surface of the base structure is substantially level along the first axis. The bottom surface is disposed at a predetermined pitch angle along a second axis of the base structure, the second axis perpendicular to the first axis, such that in response to the target surface being disposed at a predetermined pitch angle, the top surface of the base structure is substantially level along the second axis. The at least one bubble level is disposed on the top surface along the first axis to indicate a slope level of the target surface relative to the predetermined slope angle and along the second axis to indicate a pitch level of the target surface relative to the predetermined pitch angle. The base structure has a retention member disposed proximate to the rear surface and extending from the bottom surface in retention engagement direction along a third axis, the third axis perpendicular to the first axis and the second axis. The retention member is configured to hold the level apparatus in place in relation to the first axis.

In an implementation, the base structure further comprises an engagement member disposed proximate to the front surface. The engagement member is configured to engage an end of a measuring element to measure a predetermined distance from the front surface.

In an implementation, the at least one bubble level comprises a first bubble tube disposed along the first axis, and a second bubble tube disposed along the second axis.

In an implementation, the at least one bubble level comprises a bullseye bubble level.

In an implementation, the predetermined slope angle is a 10 degree down angle of the bottom surface from the rear surface to the front surface.

In an implementation, the predetermined pitch angle is 0 degrees.

In an implementation, the predetermined slope angle and the predetermined pitch angle are adjustable on the level apparatus.

In an implementation, the measuring element comprises a measuring tape to measure a predetermined horizontal distance from the front surface.

In an implementation, the predetermined horizontal distance is substantially 27 feet.

In an implementation, the measuring element comprises a string of pre-determined length to measure a predetermined length of a horizontal distance from the front surface.

In an implementation, the target surface is a gaming surface.

In an implementation, the target surface is a playing surface of a cornhole board.

In an implementation, the retention member is configured to engage along at least one of: a rear edge of the playing surface of the cornhole board and a front edge of a hole of the cornhole board.

In an implementation, the retention member is disposed at a retention angle relative to the top surface.

In an implementation, the top surface and the bottom surface overhang one or more side surfaces of the level apparatus, thereby forming one or more side retention ledges. The one or more side retention ledges are configured to receive and hold the measuring element in place in response to the measuring element not being in use.

In an implementation, a mounting element is configured to receive a keychain element.

In an implementation, the top surface comprises one or more reception areas configured to receive logo artwork.

In an implementation, a level system for measuring a level of a first target surface and a second target surface is described. The level system comprises a first level apparatus and a second level apparatus. The first level apparatus and the second level apparatus each comprise a base structure having a bottom surface, a top surface, a rear surface, and a front surface. The first level apparatus and the second level apparatus each further comprise at least one bubble level disposed on the top surface of the base structure and an engagement member disposed proximate to the front surface. The engagement member is configured to engage an end of a measuring element to measure a predetermined distance from the front surface. The bottom surface is disposed at a predetermined slope angle along a first axis of the base structure. The predetermined slope angle is associated with a desired slope angle of the target surface along the first axis, such that in response to the target surface being disposed at the predetermined slope angle, the top surface of the base structure is substantially level along the first axis. The bottom surface is disposed at a predetermined pitch angle along a second axis of the base structure. The second axis is perpendicular to the first axis, such that in response to the target surface being disposed at a predetermined pitch angle, the top surface of the base structure is substantially level along the second axis. The at least one bubble level is disposed on the top surface along the first axis to indicate a slope level of the target surface relative to the predetermined slope angle and along the second axis to indicate a pitch level of the target surface relative to the predetermined pitch angle. The base structure has a retention member disposed proximate to the rear surface and extending from the bottom surface in retention engagement direction along a third axis. The third axis is perpendicular to the first axis and the second axis. The retention member is configured to hold the level apparatus in place in relation to the first axis. The measuring element is attached to engagement member of the first level apparatus and the engagement member of the second level apparatus to measure a distance along a horizontal axis between the first level apparatus and the second level apparatus.

In an implementation, the predetermined slope angle is a 10 degree down angle. The predetermined pitch angle is 0 degrees. The distance along the horizontal axis is substantially equal to 27 feet.

In an implementation, the target surface of the first level apparatus is a playing surface of a first cornhole board and the target surface of the second level apparatus is playing surface of a second cornhole board. The distance along the horizontal axis is a distance between the first cornhole board and the second cornhole board.

BRIEF DESCRIPTION OF THE DRAWING

Aspects, features, and advantages will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. Furthermore, the drawings are not necessarily to scale, emphasis instead being placed on the concepts disclosed herein.

DETAILED DESCRIPTION

Figure 1:
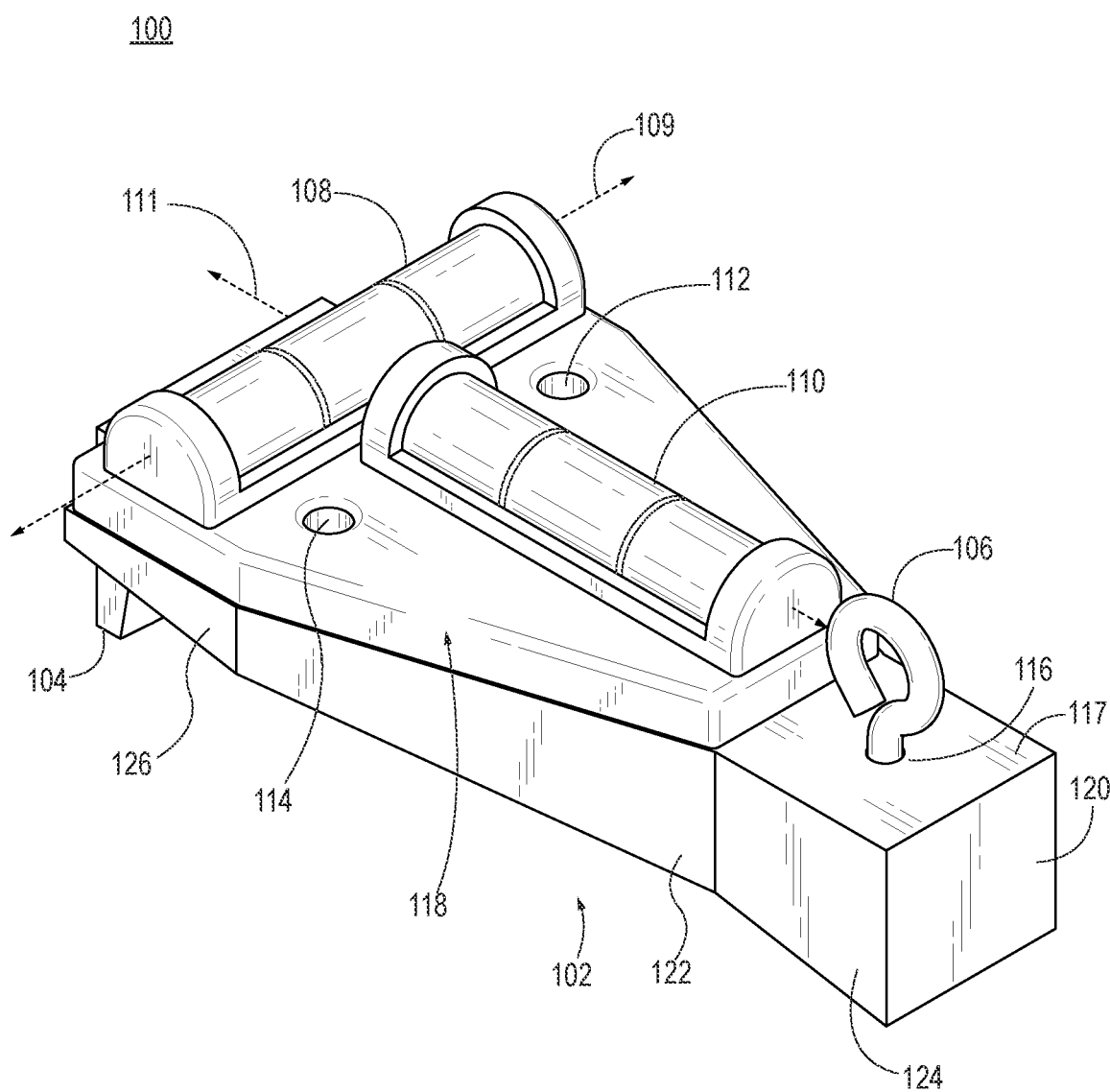
FIG. 1 shows a top perspective view of a level apparatus in accordance with described implementations.

Before the present subject matter is described in detail, it is to be understood that this disclosure is not limited to the particular implementations described, as such may vary. It should also be understood that the terminology used herein is to describing particular implementations only, and is not intended to be limiting. While this disclosure is susceptible to different implementations in different forms, there is shown in the drawings and will here be described in detail a preferred implementation of the disclosure with the understanding that the present disclosure is to be considered as an exemplification of the principles of the disclosure and is not intended to limit the broad aspect of the disclosure to the implementation illustrated. All features, elements, components, functions, and steps described with respect to any implementation provided herein are intended to be freely combinable and substitutable with those from any other implementation unless otherwise stated. Features depicted in one figure may be applied to other figures that may not depict such features. Therefore, it should be understood that what is illustrated is set forth only for the purposes of example and should not be taken as a limitation on the scope of the present disclosure.

In the following description and in the figures, like elements are identified with like reference numerals. The use of "e.g.," "etc.,", "or" and "the like" indicates non-exclusive alternatives without limitation, unless otherwise noted. The use of "having", "comprising", "including" or "includes" means "including, but not limited to," or "includes, but not limited to," unless otherwise noted.

In accordance with described implementations, a level for a gaming surface, such as a cornhole board, is provided. Cornhole is a game where two playing boards are placed a set distance from each other on a variety of surfaces, such as lawns, beaches, paved areas, and so forth. However, such surfaces may be uneven and irregular, which may create different playing conditions, advantages, and disadvantages for competing players.

Figure 17:
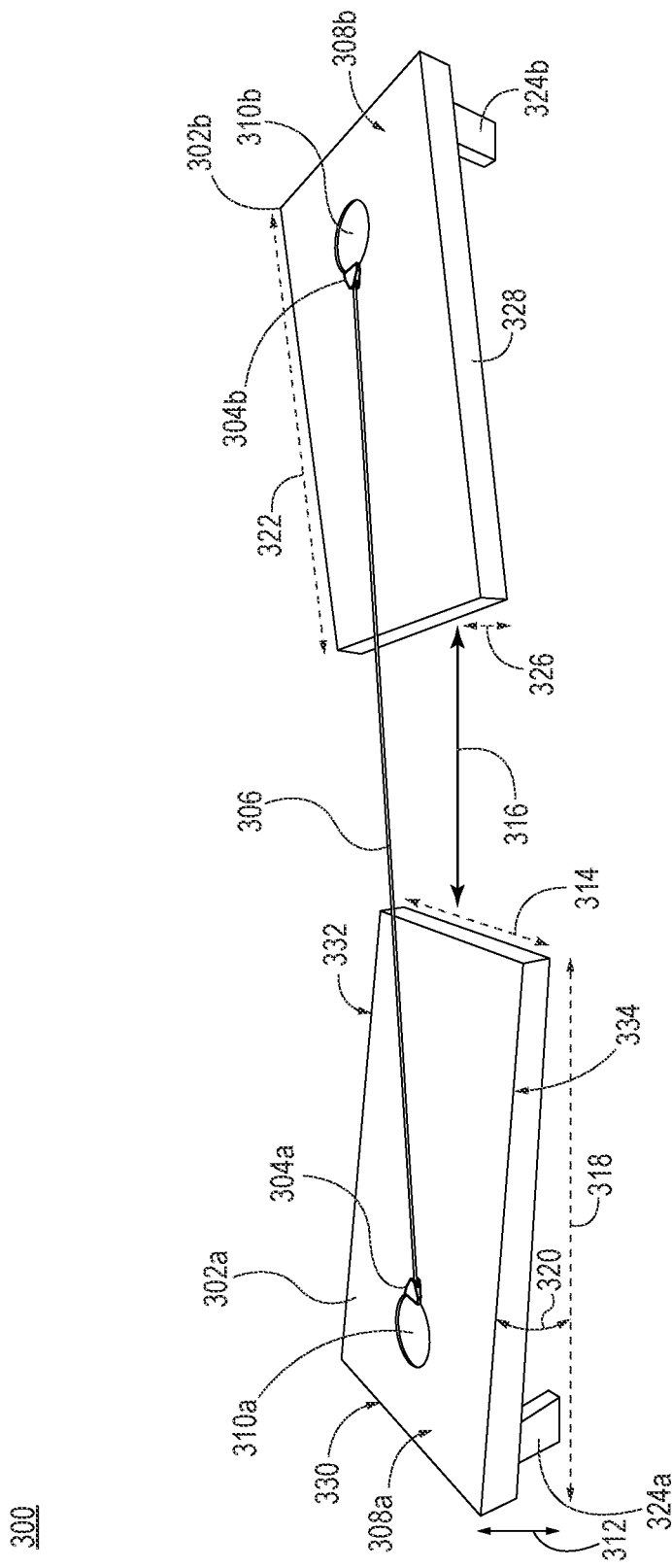
FIG. 17 shows a diagram of a level system used in conjunction with gaming boards, in accordance with described implementations.

For example, FIG. 17 shows an illustrative layout of a cornhole competition setup 300. As shown, two cornhole boards 302a and 302b might be placed a set distance (e.g., 27 feet apart from front to front, as shown by line 316) from each other. Each board 302a, 302b has a hole 310a and 310b, respectively, through which a player (not depicted) attempts to throw a beanbag when standing near the opposite board. Points may be awarded, for example, based on how many beanbags per turn each player makes through the respective hole, how many beanbags for each player land and remain on the respective board surfaces 308a, 308b, and so on.

In general, cornhole boards 302a, 302b are approximately 48 inches in length (e.g., along line 322), are approximately 24 inches wide (e.g., along line 314), are approximately 12 inches at their highest point (e.g., at line 312), and are approximately 3 inches (or between 1-6 inches) at their shortest point (e.g., at line 326).

Boards are typically made of smooth plywood for surfaces 308a, 308b and may use 2×4" boards for frames (e.g., legs 324, frames 328, etc.). Holes 310a, 310b are approximately 6 inches in diameter with the hole center located 9 inches from top edge 330 and 12 inches from each side of the board edges (e.g., 332, 334). It is desirable in a cornhole game for each of boards 302a, 302b to be level (e.g., 0 degree angle) from side-to-side (e.g., with respect to line 314) and that each board surface 308a, 308b has an approximately 10 degree pitch (e.g., angle 320 is 10 degrees, however, the pitch may fall within a +/−10 degree range).

As such, it can be seen that if boards 302a, 302b do not have substantially similar pitch angles (e.g., along line 314) or do not have substantially similar slope angles (e.g., angle 320 along line 318), then competing players may experience different playing conditions depending on which of boards 302a, 302b they throw toward. While many players attempt to get the board pitch level to be approximately the same for both boards 302a, 302b (e.g., along line 314), many will not attempt to also make the pitch angle approximately the same for both boards 302a, 302b. As can be seen, if board 302 has a pitch of, for example, 7 degrees and board 302b has a pitch of, for example 12 degrees, it is easier to not have a beanbag fly off the back of board 302b given its steeper pitch, and thus the player(s) throwing beanbags at board 302b may have an easier time scoring points than the players throwing beanbags at board 302a. Thus, player(s) throwing beanbags at board 302b may have an unfair advantage in the game. Implementations of the disclosure address the above deficiencies by providing a level apparatus that determines the slope of the board(s) in two dimensions.

Referring now to FIG. 1, a top perspective view of an illustrative level 100 is depicted. As will be described, level 100 is beneficially adapted to measure angles in two dimensions simultaneously, e.g., to measure a pitch angle in one axis and a slope angle in another axis. As depicted, implementations of level 100 include a base structure 102 and a level structure 118. In some implementations, level structure 118 includes a first tube bubble level 108 disposed to measure a relative pitch angle along axis 109 and a second tube bubble level 110 disposed to measure a relative slope angle along axis 111.

A bubble level may generally be a sealed tube enclosing a liquid and an air bubble or float to indicate an angle relative to a reference surface. As shown in FIG. 1, axis 109 and axis 111 may be substantially perpendicular (e.g., at a 90 degree angle in relation) to each other, for example in a cross-check level arrangement. Tube bubble levels 108 and 110 may be disposed on or integral to level structure 118. In one example, one or both of tube bubble levels 108 and 110 may be glued or otherwise be permanently affixed to level structure 118. In another example, one or both of tube bubble levels 108 and 110 may be temporarily affixed to level structure 118 and may be removed and swapped out or otherwise replaced by a user. One or both of tube bubble levels 108 and 110 may be affixed to level structure 118 via a male-female joint connection, snap-in compression, a threaded connection, a snap-on connection, a hook and loop connection, etc., and/or each of the tube bubble levels 108 and 110 may be capable of sliding into a respective recess (not depicted) in level structure 118 and form a tight fitting connection upon being placed within the respective recess. For example, one or both of tube bubble levels 108 and 110 may be affixed to level structure 118 in a manner that one or both of tube bubble levels 108 and 110 snap on to or otherwise connect with the bottom of level structure 118 and form a tight fitting connection to the bottom and sides of level structure 118 so that one or both of tube bubble levels 108 and 110 are secured to level structure 118 and are prevented from sliding out of level structure 118.

In some implementations, level structure 118 may include one or more holes (shown as 112 and 114) to align and mount, either permanently or removably, level structure 118 to base structure 102 by way of screws, rivets, bolts, pegs, or other connectors (not depicted).

As depicted in FIG. 1, base structure 102 may include a top surface 117, a front surface 120, one or more side surfaces 122, 124, 126, and a retention tab 104. Top surface 117 may include an engagement element 106, such as a hook, eye, pin, post, or other connector to which a tape measure, string, or the like might hooked, tied, or attached. Engagement element 106 might be mounted to base structure 102 via hole 116. As will be described, a bottom surface of base structure 102 (shown as 128 in FIG. 2) might be sloped at a desired angle in relation to top surface 117 of base structure 102, such that top surface 117 is substantially flat or level when level 100 is placed on a target surface (not depicted) having a slope substantially similar to (or the same as) the angle of the bottom surface of base structure 102.

Figure 2:
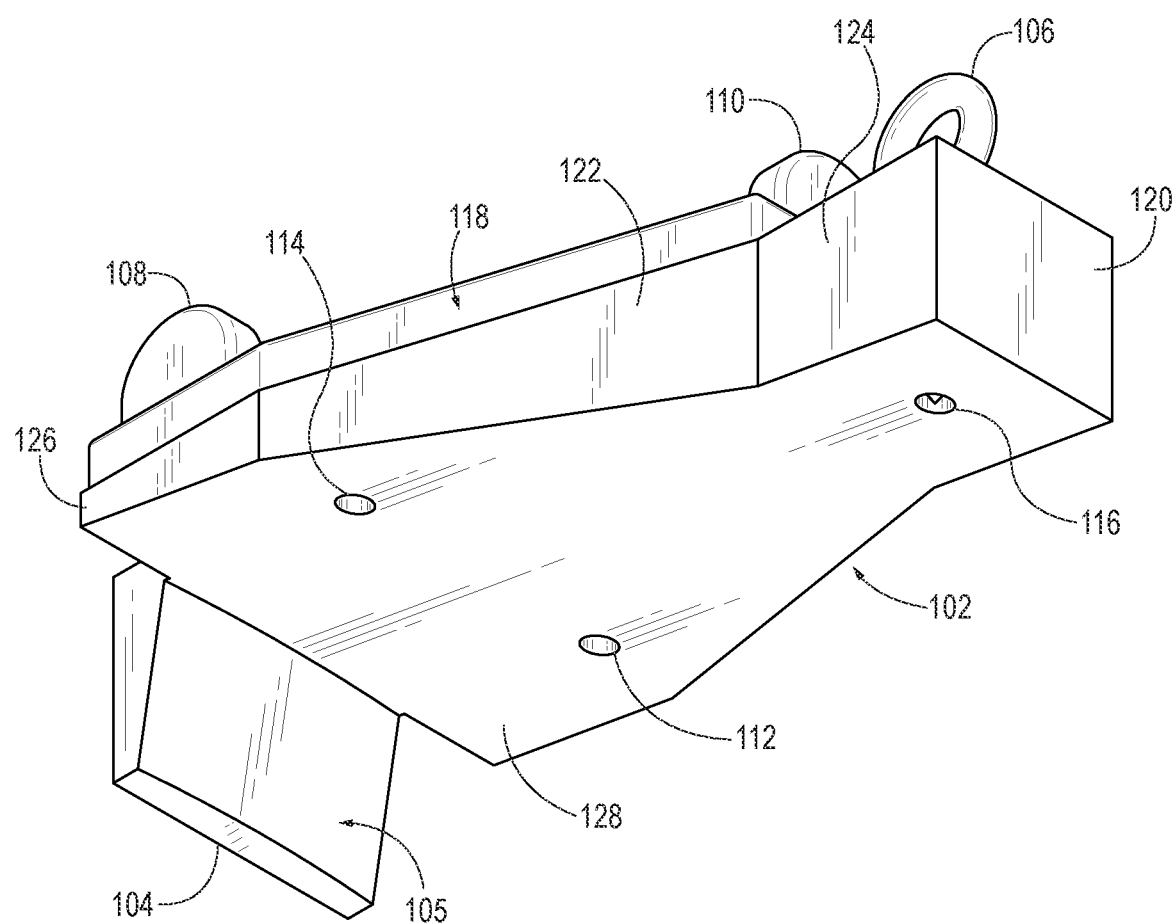
FIG. 2 shows a bottom perspective view of the level apparatus of FIG. 1.

FIG. 2 shows a bottom perspective view of level 100. As shown in FIG. 2, base structure 102 has a bottom surface 128. As shown, retention tab 104 is disposed proximate to a rear surface (shown as 119 in FIG. 4) of base structure 102 (e.g., retention tab 104 is disposed opposite front surface 120). Retention tab 104 extends along an axis perpendicular to top surface 117 of base structure 102 to engage with an edge of a target surface (not depicted) to be measured by level 100.

Figure 3:
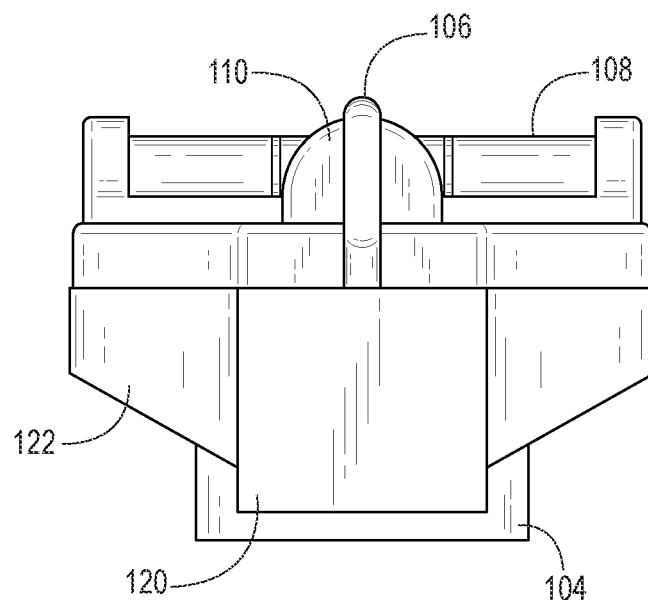
FIG. 3 shows a front orthographic view of the level apparatus of FIG. 1.

FIG. 3 shows a front view of level 100. As shown, tube bubble levels 108 and 110 may be disposed along axes that are substantially perpendicular (e.g., at a 90 degree angle in relation) to one another. In some implementations, retention tab 104 may extend beyond the depth of base structure 102.

Figure 4:
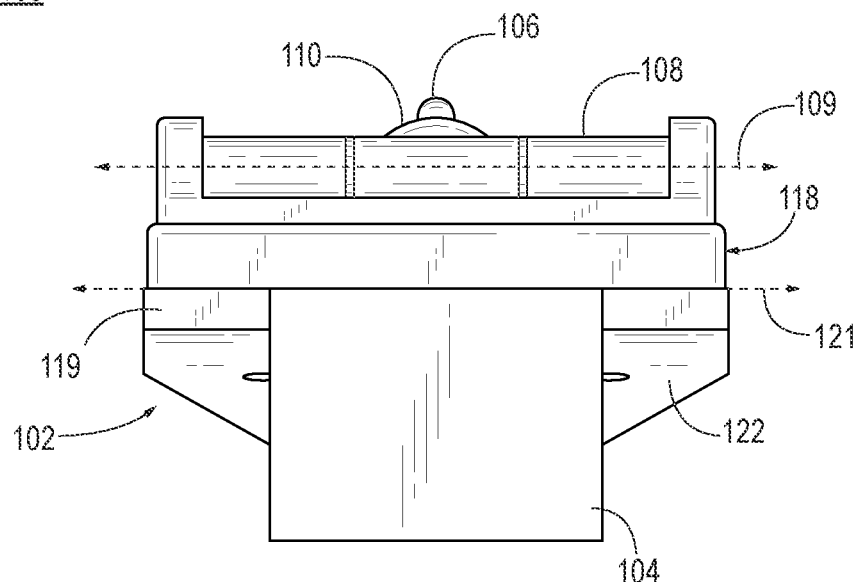
FIG. 4 shows a rear orthographic view of the level apparatus of FIG. 1.

FIG. 4 shows a rear view of level 100. As shown in FIG. 4, base structure 102 has a rear surface 119 located opposite front surface 120. Retention tab 104 is proximate to, and may be integral to, rear surface 119. As depicted, base structure 102 may have a pitch angle relative to axis 121 (shown as substantially 0 degrees in FIG. 4) to measure a pitch angle of a target surface (not depicted). Axis 121 may be substantially parallel to axis 109 (i.e., such that the respective lines extending along axes 121 and 109 never intersect each other and the distance between these lines is the same along all points) along which level tube 108 is disposed.

Figure 5:
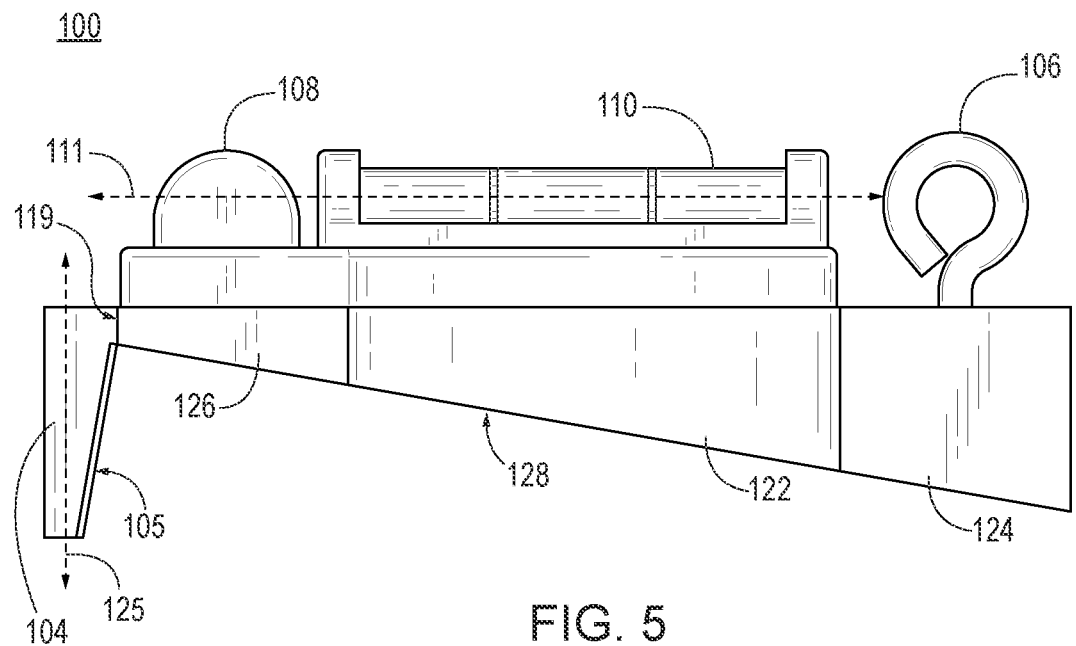
FIG. 5 shows a left side orthographic view of the level apparatus of FIG. 1.
Figure 6:
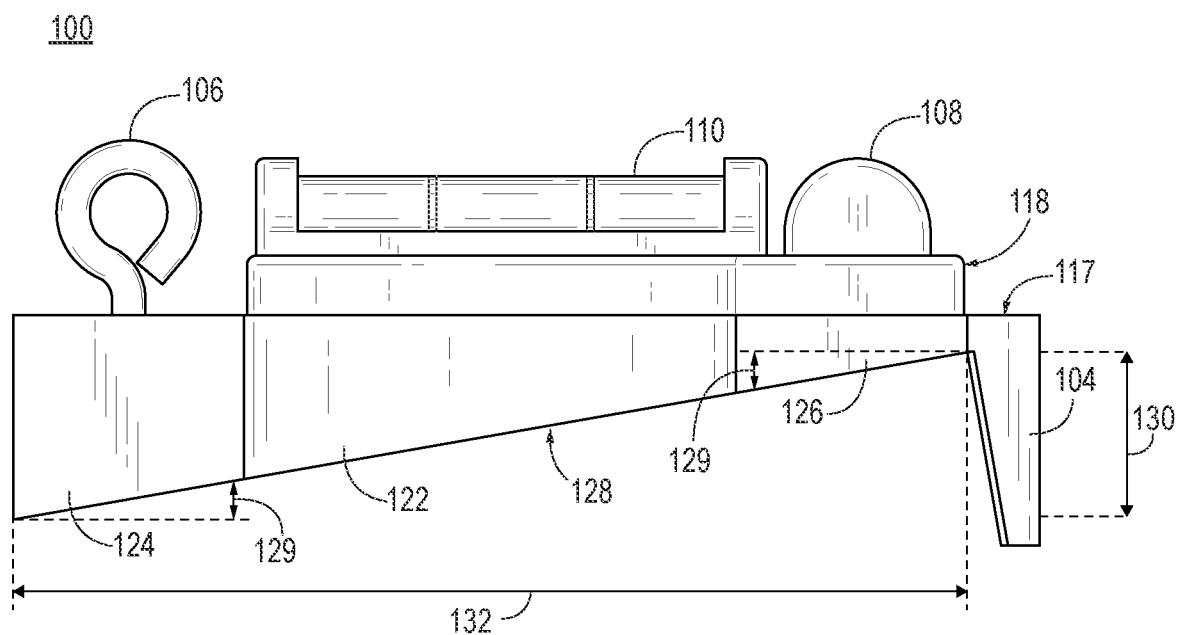
FIG. 6 shows a right side orthographic view of the level apparatus of FIG. 1.

FIGS. 5 and 6 show side views of level 100. As shown, bottom surface 128 is disposed at a slope angle 129 relative to top surface 117 and, thus, to the slope of a target surface (not depicted). As shown, retention tab 104 may extend along an axis 125 that is substantially perpendicular (e.g., at a 90 degree angle in relation) to axes 109 and 111. Retention tab 104 may have a retention depth shown as 130, and level 100 may measure the level of a target surface for a length shown as 132. For example, retention tab 104 might have a depth sufficient to engage a target surface having a thickness anywhere between ⅛" and 1". Some implementations of retention tab 104 may have a textured front retention surface 105 to grip or otherwise engage an edge of the target surface. For example, front retention surface 105 may include rubber grips or otherwise have a rough, non-smooth, textured surface to facilitate better grip with an edge of the target surface.

In some implementations, retention tab 104 might be replaced by a hole in base structure 102 located in a substantially similar location as retention tab 104, for example to removably attach level 100 to the target surface, for example via a nail, screw, bolt, post, tab, or other similar attachments.

As described herein, in some implementations, slope angle 129 may be approximately 10 degrees, but other slope angles may be employed. Similarly, as described herein, the pitch angle relative to axis 121 may be approximately 0 degrees, although other pitch angles may be employed. For example, in some implementations, level 100 might include multiple replaceable base structures 102 that can be removably mounted to level structure 118, enabling level structure 108 to measure a variety of slope angles and pitch angles. In other implementations, base structure 102 may be mechanically adjustable to enable level structure 108 to measure a variety of slope angles and pitch angles. By virtue of bottom surface 128 of base structure 102 having a slope angle relative to axis 111 and a pitch angle relative to axis 109, bubble tube levels 108 and 110 may both read approximately 0 degrees (e.g., level) when the target surface has a desired slope angle and a desired pitch angle substantially equal to the slope angle and the pitch angle of base structure 102.

Figure 7:
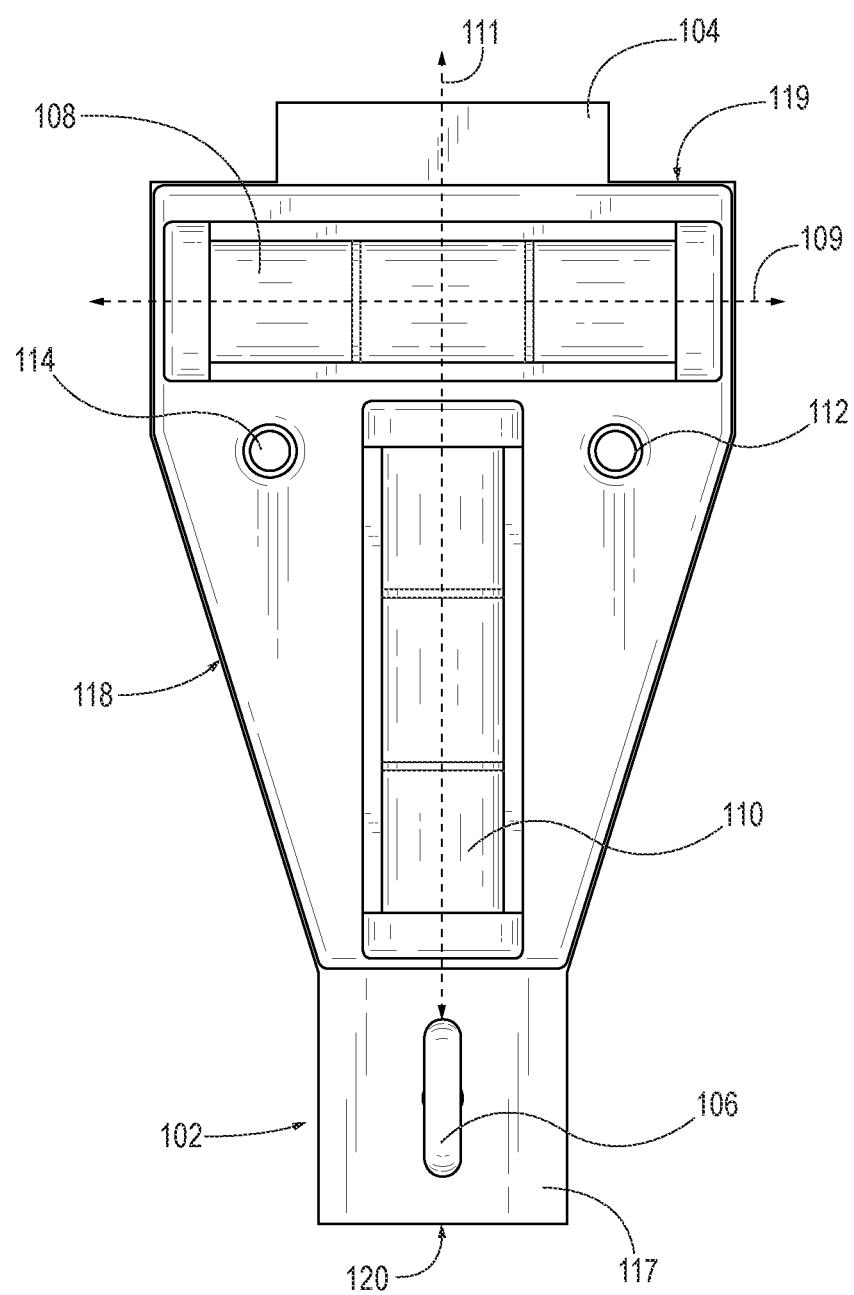
FIG. 7 shows a top orthographic view of the level apparatus of FIG. 1.

FIG. 7 shows a top orthographic view of level 100, further illustrating that, in some implementations, retention tab 104 is disposed proximate to rear surface 119, and that axes 109 and 111, along which bubble tube levels 108 and 110, respectively, are disposed, are substantially perpendicular (e.g., at a 90 degree angle in relation) to each other.

Figure 8:
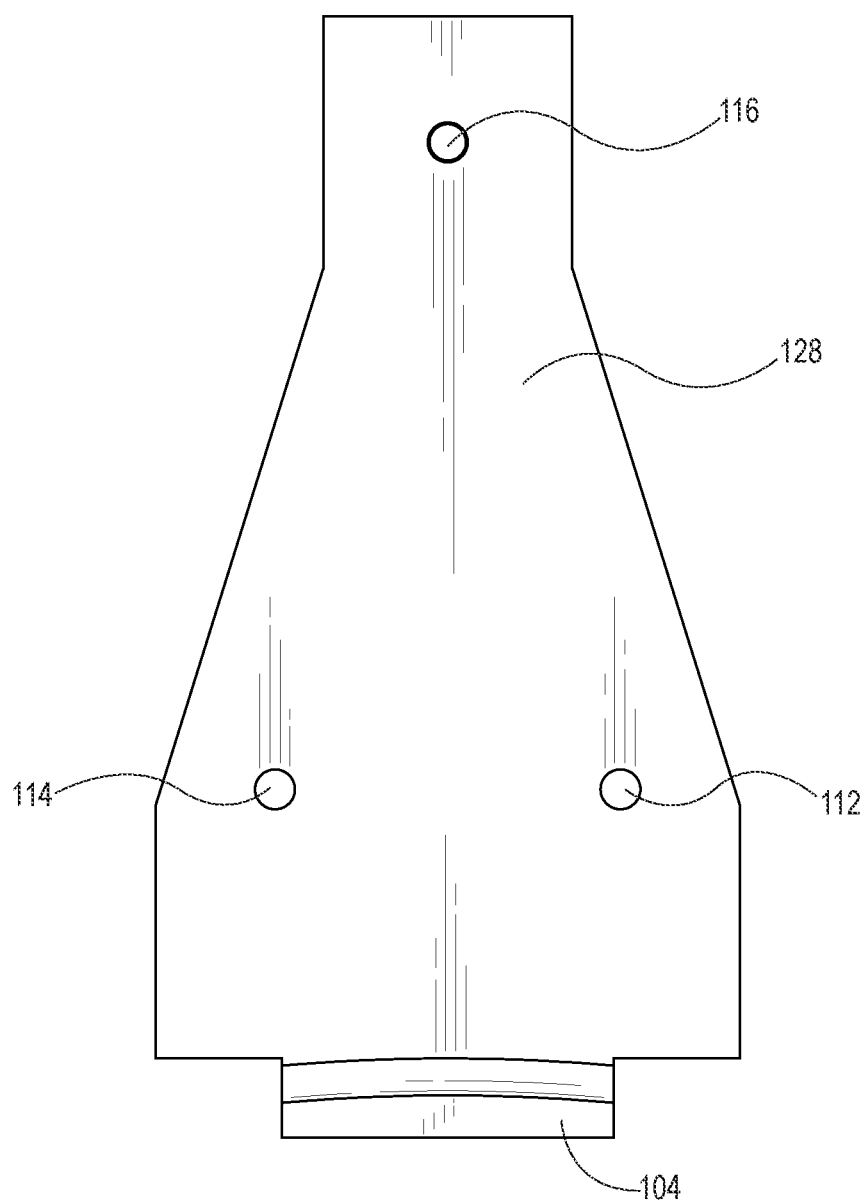
FIG. 8 shows a bottom orthographic view of the level apparatus of FIG. 1.

FIG. 8 shows a bottom view of level 100. In some implementations, holes 112, 114, and 116 may extend entirely through base structure 102. In other implementations, holes 112, 114, and 116 may only extend into base structure 102.

Figure 9:
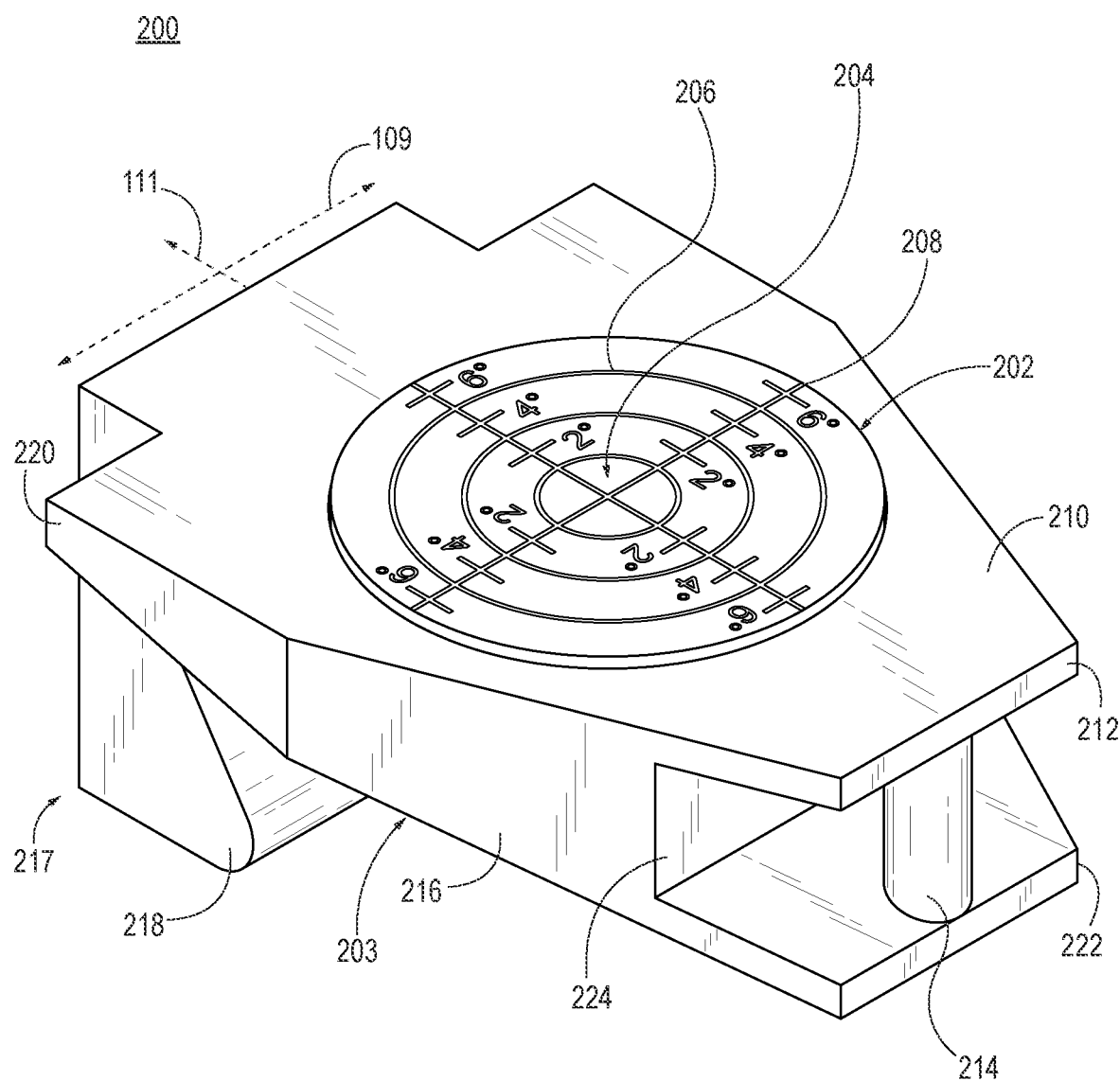
FIG. 9 shows a top perspective view of a level apparatus in accordance with described implementations.

FIG. 9 shows a top perspective view of another illustrative level, 200. As will be described, level 200 is beneficially adapted to measure angles in two dimensions simultaneously, e.g., to measure a pitch angle in one axis and a slope angle in another axis. As shown, implementations of level 200 include a base structure 203 and a level 202. In some implementations, level 202 may be a bullseye level disposed to measure a relative pitch angle along axis 109 and a relative slope angle along axis 111. For example, bullseye level 202 may be an inclinometer capable of measuring slope in two dimensions simultaneously. As depicted, bullseye level 202 includes numerical representations 240 corresponding to respective angles, however, other numerical and/or non-numerical representations may instead be used. Bullseye level 202 may be disposed on or integral to base structure 203.

As shown in FIG. 9, the measurement axes might be labeled on level 202, for example corresponding to axis markings 208. As described, axis 109 and axis 111 may be substantially perpendicular (e.g., at a 90 degree angle in relation) to each other. As shown, bullseye level 202 may be marked with grid lines 206, which may be generally concentric circles. Bullseye level 202 may have a flat or curved top and may have degree markings as well as axis and grid markings. The bullseye level generally is a round enclosure encapsulating a fluid and a float 204. Many fluids may be utilized, such as water, glycerin, oil, and so forth. Float 204 might be an air bubble or a plastic ball. Float 204 moves in relation to a two-dimensional inclination (e.g., a slope angle and a pitch angle as described herein) of a target surface (not depicted). Bullseye level 202 thus allows as user to determine an angle of inclination with respect to the two axes.

As shown in FIG. 9, base structure 203 may include a top surface 210, one or more side surfaces 216, 220, a front surface 224, a post 214 in an opening formed between ledges 212 and 222, and a retention tab 217 having an engagement lip 218. Post 214 might engage with a tape measure, string, or the like that might be hooked, tied, or attached to post 214. As described herein, a bottom surface of base structure 203 (shown as 226 in FIG. 10) might be sloped at a desired angle in relation to top surface 210 of base structure 203, such that top surface 210 is substantially flat or level when level 200 is placed on a target surface (not depicted) having a slope substantially similar to the angle of the bottom surface (226 of FIG. 10) of base structure 203.

In some implementations such as shown in FIG. 9, base structure 203 may include a mounting structure (not shown), for example, toward the rear of base structure 203 opposite post 214. For example, the mounting structure may be mounted in retention tab 217 or above retention tab 217 in top surface 210 near the rear of top surface 210 along axis 111 and approximately centered in top surface 210 along axis 109. In some implementations, the mounting structure may be implemented as a metal pin that connects to a keychain ring. Further, in some implementations, top surface 210 may include one or more areas to place logos, names, and/or other artwork to allow level 200 to be custom-branded, for example areas of top surface 210 not occupied by level 202. The artwork may be implemented as decals affixed directly to top surface 210, or may alternatively be implemented as separate physical pieces attached to, etched onto and/or embedded within top surface 210.

Figure 10:
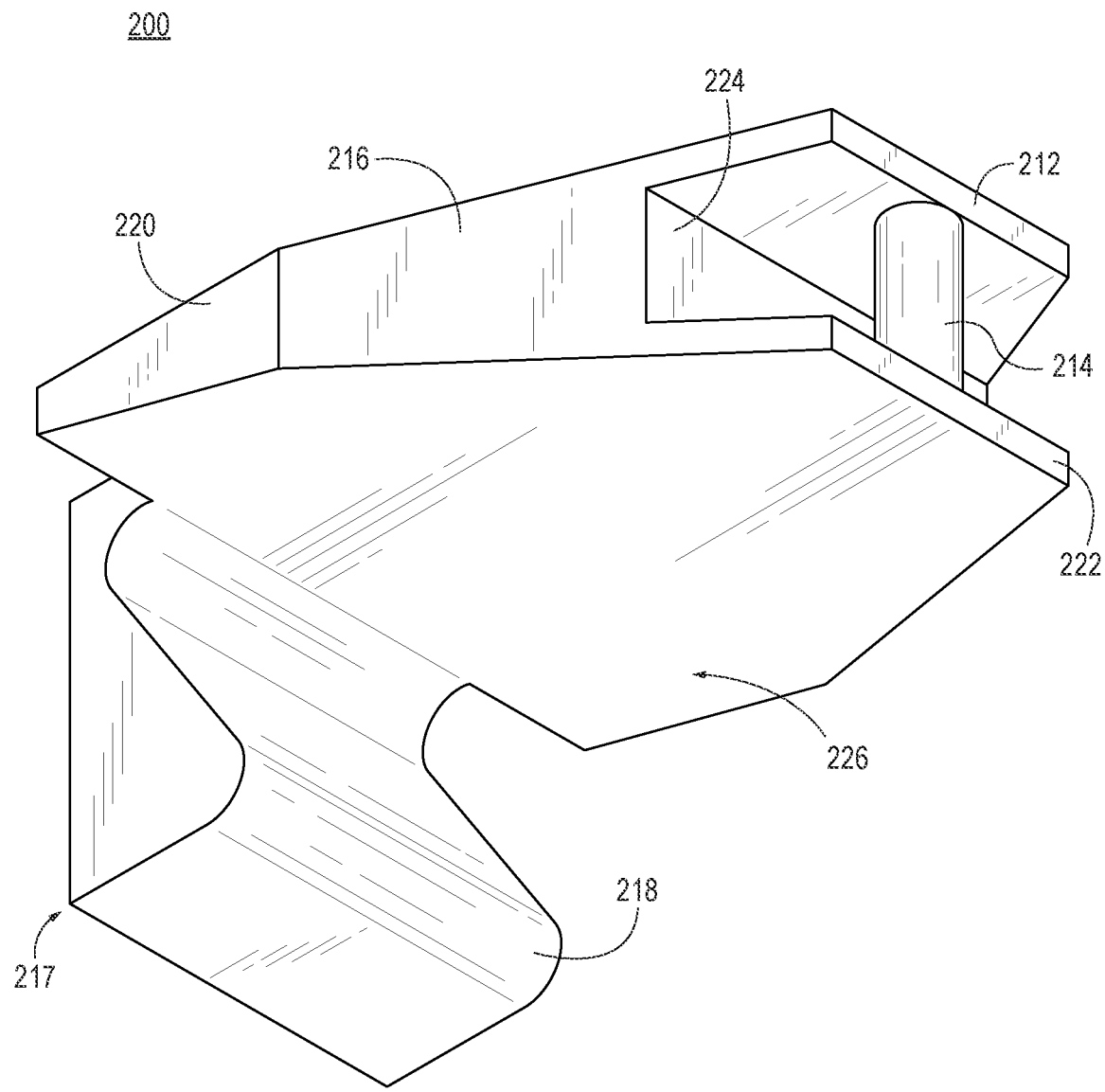
FIG. 10 shows a bottom perspective view of the level apparatus of FIG. 9.

FIG. 10 shows a bottom perspective view of level 200. As shown in FIG. 10, base structure 203 has a bottom surface 226. As shown, retention tab 217 is disposed proximate to a rear surface of base structure 203 (e.g., retention tab 217 is disposed opposite front surface 224). Retention tab 217 extends along an axis perpendicular to top surface 210 of base structure 203 (e.g., axis 125 shown in FIG. 13) to engage with an edge of a target surface (not depicted) to be measured by level 200.

Figure 11:
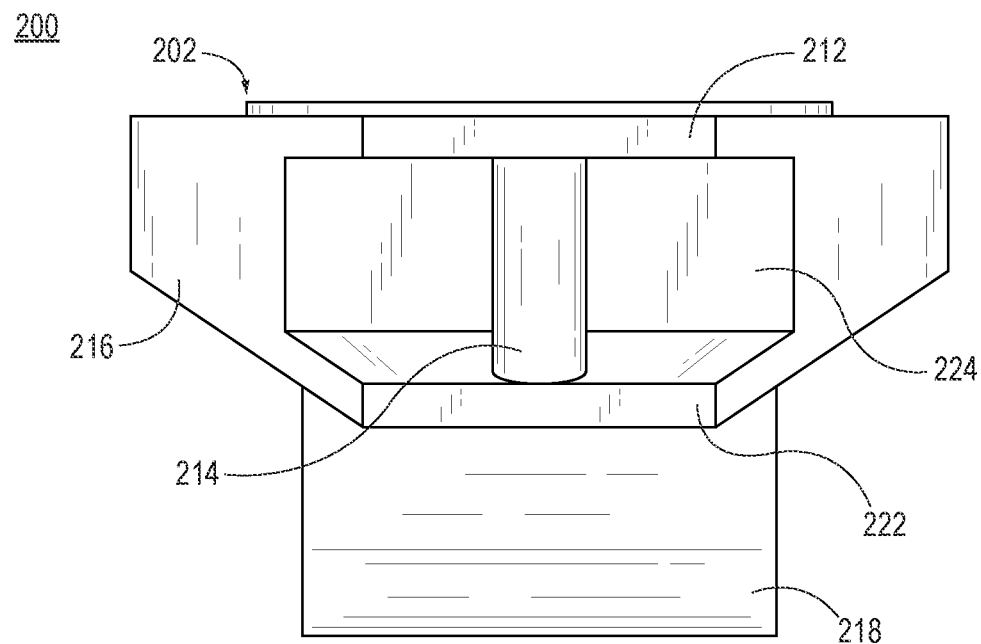
FIG. 11 shows a front orthographic view of the level apparatus of FIG. 9.

FIG. 11 shows a front view of level 200. As shown, retention tab 217 and engagement lip 218 may extend beyond the depth of base structure 203. Post 214 is disposed in an opening in front of front surface 224 formed by ledges 212 and 222. Bullseye level 202 is disposed on top surface 210 of base structure 203 and/or is integral to base structure 203. In one example, bullseye level 202 may be glued or otherwise be permanently affixed to base structure 203. In another example, bullseye level 202 may be temporarily affixed to base structure 203 and may be removed and swapped out or otherwise replaced by a user. Bullseye level 202 may be affixed to base structure 203 via a male-female joint connection, a threaded connection, a snap-on connection, snap-in compression, a hook and loop connection, etc., and/or bullseye level 202 may be capable of sliding into a recess (not depicted) in base structure 203 and form a tight fitting connection upon being placed within the recess. For example, bullseye level 202 may be affixed to base structure 203 in a manner that bullseye level 202 snaps on to or otherwise connects with the bottom of base structure 203 and forms a tight fitting connection to the bottom and sides of base structure 203 so that bullseye level 202 is secured to base structure 203 and is prevented from sliding out of base structure 203.

Figure 12:
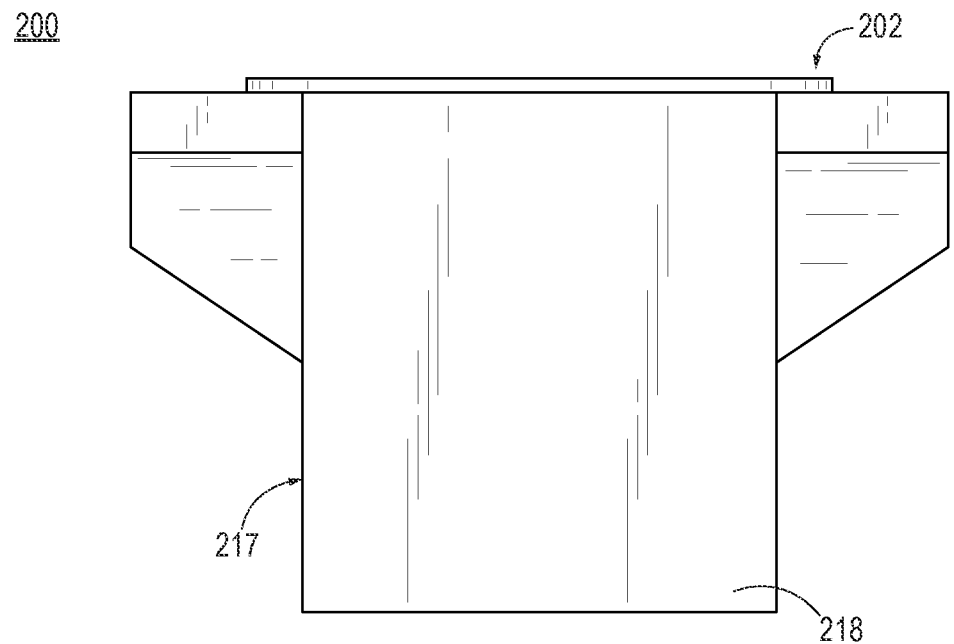
FIG. 12 shows a rear orthographic view of the level apparatus of FIG. 9.

FIG. 12 shows a rear view of level 200. As shown in FIG. 12, retention tab 217 is proximate to a rear surface of, and may be integral to, base structure 203. As shown, base structure 203 may have a pitch angle relative to axis 109 of FIG. 9 (shown as substantially 0 degrees in FIG. 12) to measure a pitch angle of a target surface (not depicted). Engagement lip 218 is disposed proximate to a bottom surface and front surface of retention tab 217 to engage with an edge of the target surface to be measured by level 200.

Figure 13:
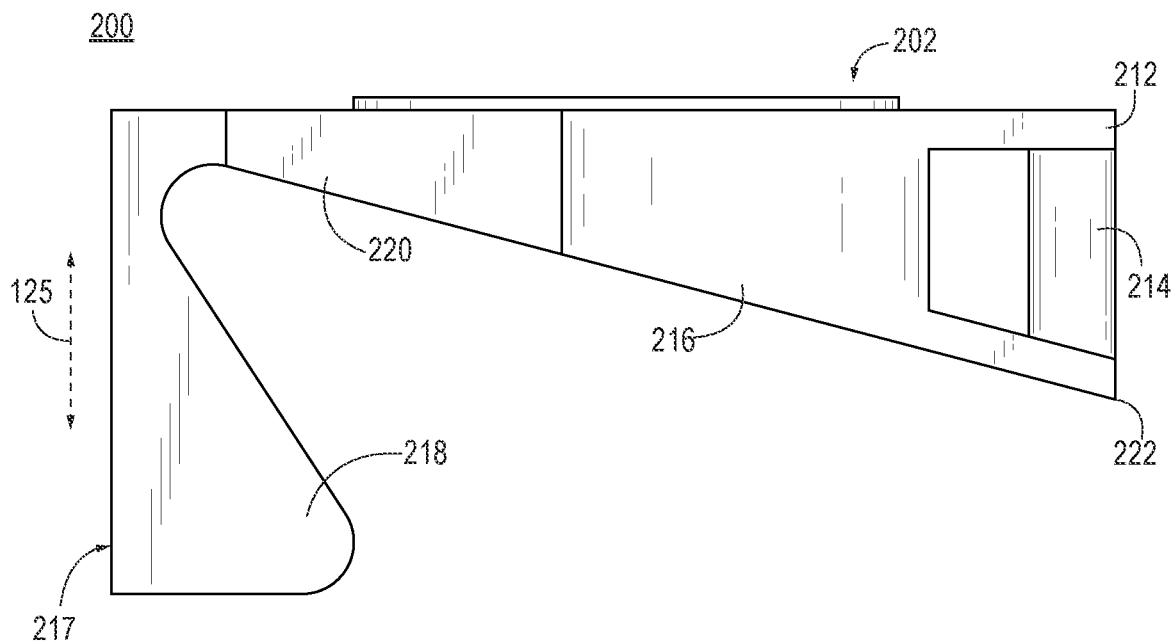
FIG. 13 shows a left side orthographic view of the level apparatus of FIG. 9.
Figure 14:
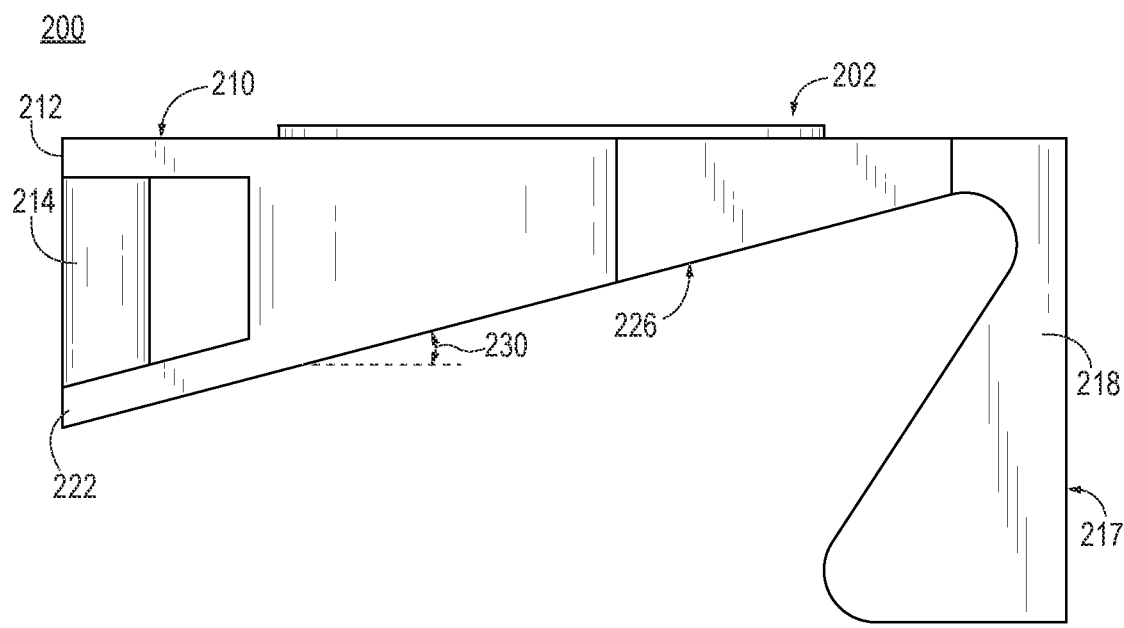
FIG. 14 shows a right side orthographic view of the level apparatus of FIG. 9.

FIGS. 13 and 14 show side views of level 200. As shown, bottom surface 226 of base structure 203 is disposed at a slope angle 230 relative to top surface 210 and, thus, to the slope of a target surface (not depicted). As shown, retention tab 217 may extend along an axis 125 that is substantially perpendicular (e.g., at a 90 degree angle in relation) to top surface 210 (e.g., to axes 109 and 111). Retention tab 217 may have a depth sufficient to engage a target surface having a thickness anywhere between ⅛" and 1". Some implementations of retention tab 217 may have a textured front retention surface to grip or otherwise engage an edge of the target surface. For example, the retention surface may include rubber grips or otherwise have a rough, non-smooth, textured surface to facilitate better grip with an edge of the target surface.

In some implementations, retention tab 217 might be replaced by a hole in base structure 203 located in a substantially similar location as retention tab 217, for example to removably attach level 200 to the target surface, for example via a nail, screw, bolt, post, tab, or other similar attachments.

As described herein, in some implementations, slope angle 230 may be approximately 10 degrees, but other slope angles may be employed. Similarly, as described herein, the pitch angle relative to axis 109 may be approximately 0 degrees, although other pitch angles may be employed. For example, in some implementations, level 200 might include multiple replaceable base structures 203 that can be removably mounted to level 202, enabling level structure 108 to measure a variety of slope angles and pitch angles.

In other implementations, base structure 203 may be mechanically adjustable to enable level 202 to measure a variety of slope angles and pitch angles. By virtue of bottom surface 226 of base structure 203 having a slope angle relative to axis 111 and a pitch angle relative to axis 109, bullseye level 202 might read approximately 0 degrees (e.g., level) when the target surface has a desired slope angle and a desired pitch angle substantially equal to the slope angle and the pitch angle of base structure 203. In one example, base structure 203 may maintain the slope angle, however, bullseye level 202 may be adjusted by sliding along any plane.

Figure 15:
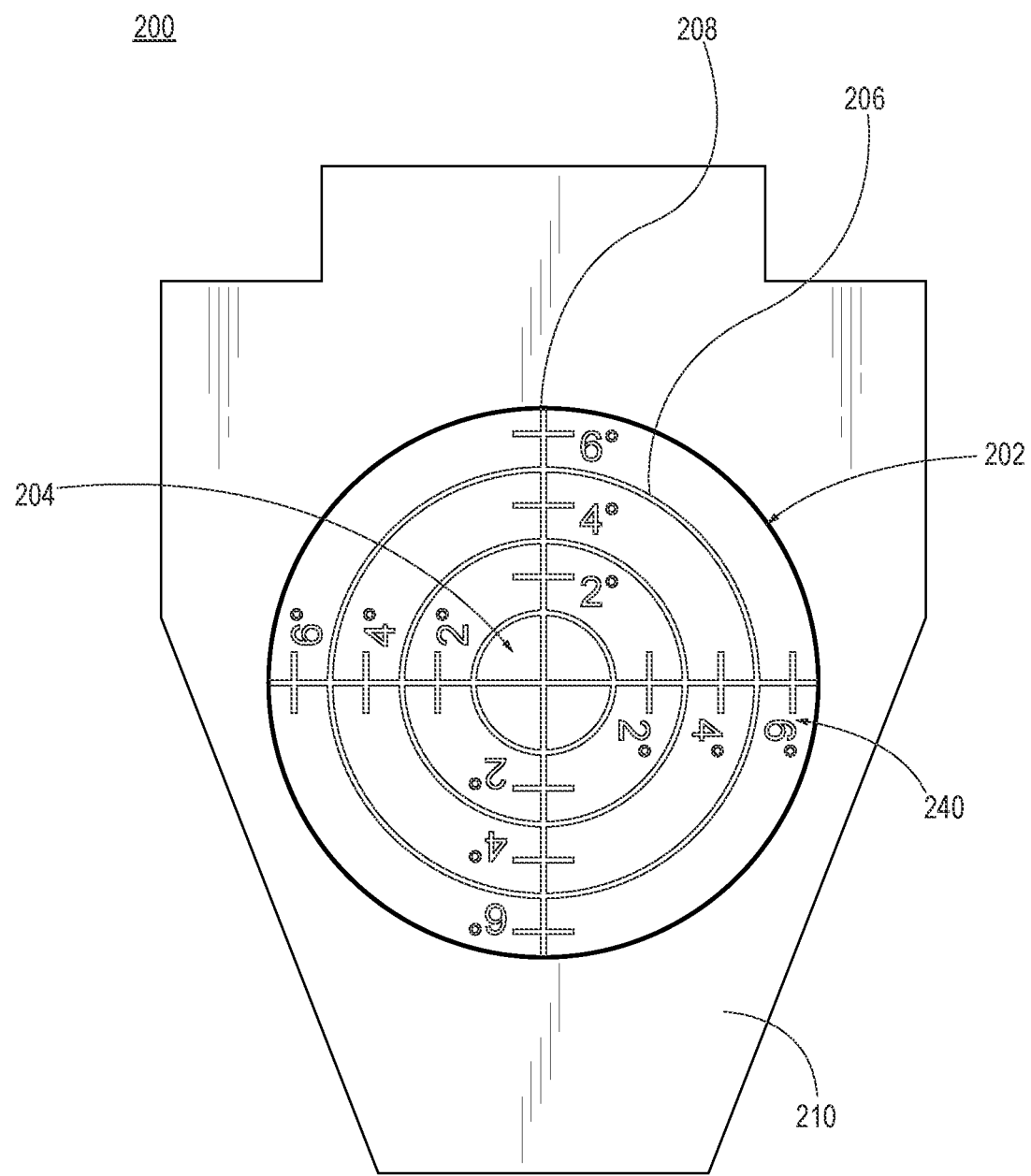
FIG. 15 shows a top orthographic view of the level apparatus of FIG. 9.
Figure 16:
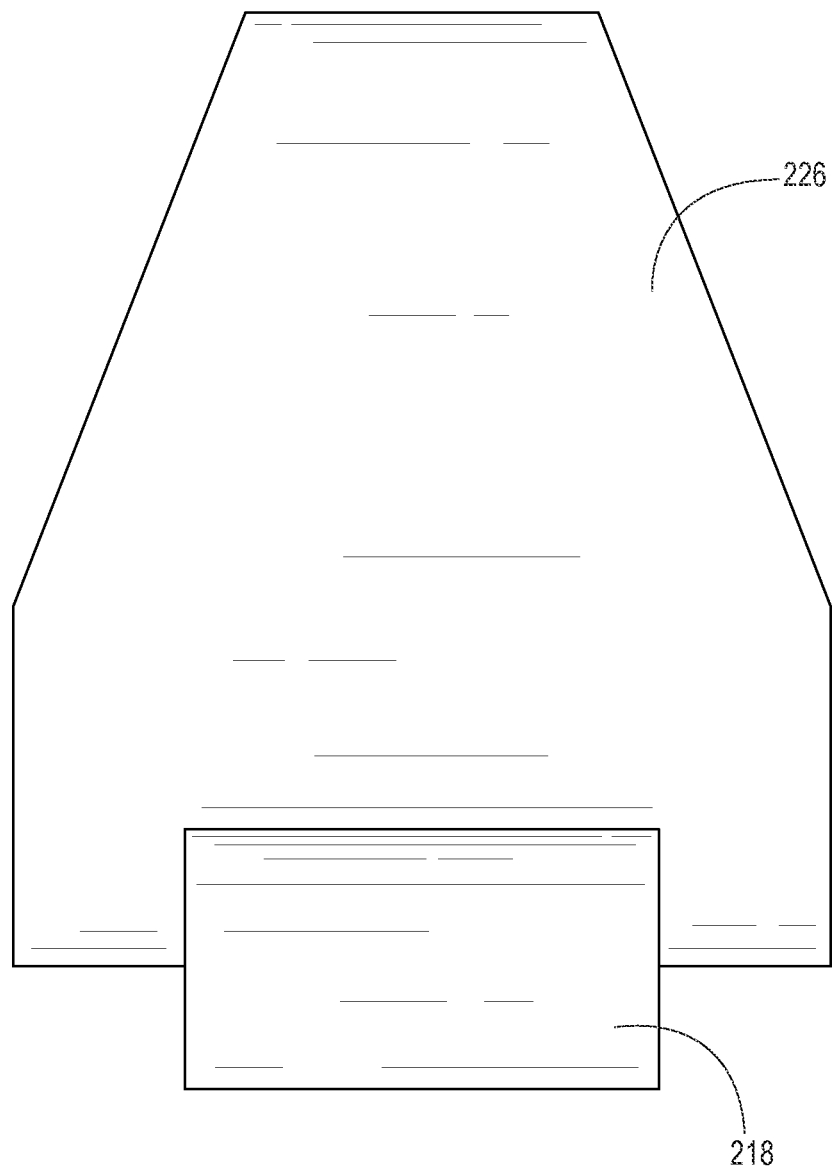
FIG. 16 shows a bottom orthographic view of the level apparatus of FIG. 9.

FIG. 15 shows a top orthographic view of level 200, and FIG. 16 shows a bottom orthographic view of level 200, further illustrating that, in some implementations, retention tab 217 is disposed proximate to a rear surface of base structure 203, and that axes 109 and 111 are substantially perpendicular (e.g., at a 90 degree angle in relation) to each other. In some implementations, engagement lip 218 is disposed beneath bottom surface 226 of base structure 203.

Figure 18:
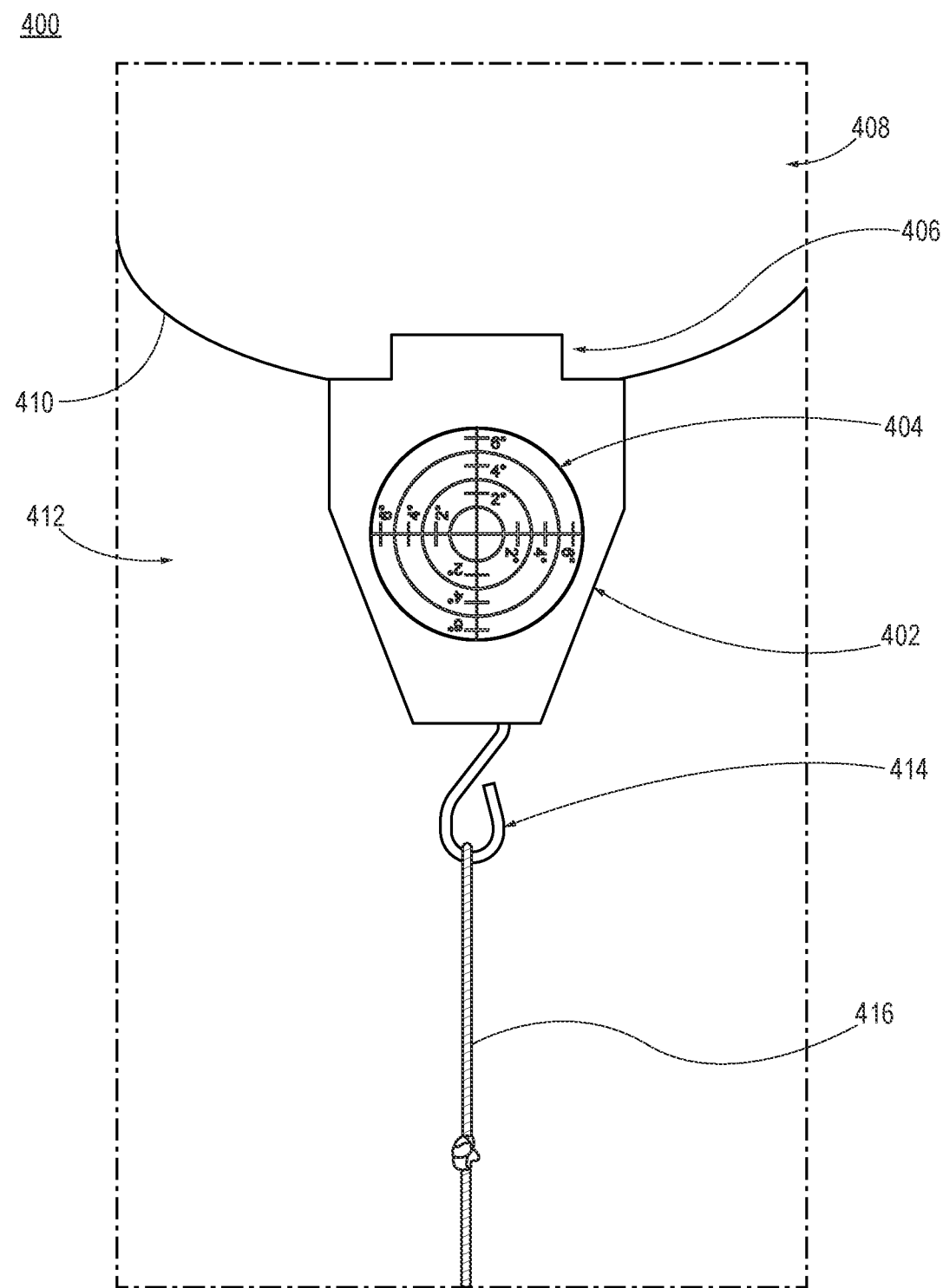
FIG. 18 shows a first diagram of a level apparatus used in conjunction with a gaming board, in accordance with described implementations.
Figure 19:
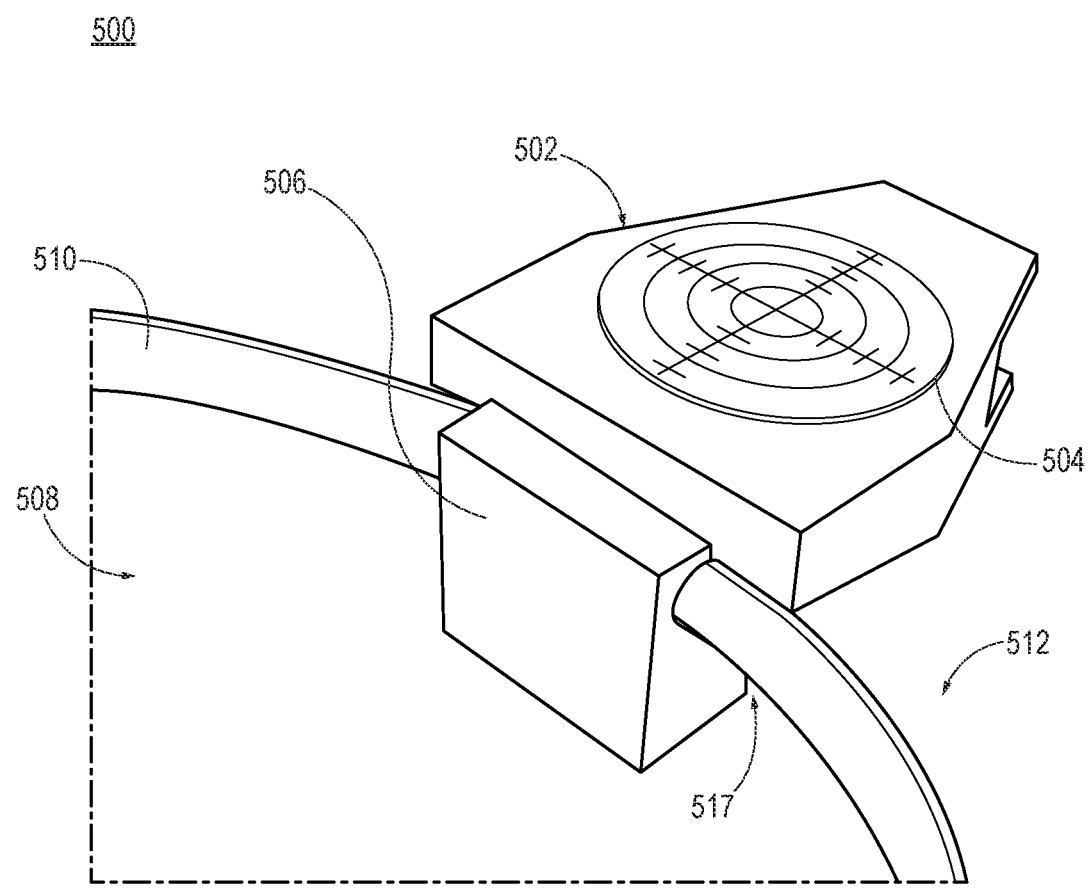
FIG. 19 shows a second diagram of a level apparatus used in conjunction with a gaming board, in accordance with described implementations.

FIGS. 18 and 19 show implementations of the described level used in conjunction with a gaming board 400 and 500, respectively, such as a cornhole board. As shown in FIG. 18, level 402 might be set upon target surface 412 for bullseye bubble level 404 to measure the level of target surface 412 against a desired slope angle (e.g., 10 degrees) and a desired pitch angle (e.g., 0 degrees). Similarly, as shown in FIG. 19, level 502 might be set upon target surface 512 for bullseye bubble level 504 to measure the level of target surface 512 against a desired slope angle (e.g., 10 degrees) and a desired pitch angle (e.g., 0 degrees). As described herein, due to the shape of base structure 102 and/or base structure 203, when target surface 412 is substantially at the desired slope and pitch, bubble tube levels 108 and 110 and/or bullseye bubble level 202 might read substantially 0 degrees in both axes.

As shown in FIG. 18, level 402 might be attached to target surface 412 by way of the retention tab 406. Retention tab 406 might optionally engage with edge 410 of cornhole board hole 408, as shown. The retention tab 406 may have a textured front retention surface to grip or otherwise engage with edge 410 of cornhole board hole 408. When placed along the edge of the cornhole board hole, level 402 is preferably centered on the cornhole board, since, as level 402 is moved off-center in either direction, level 402 might become off-level as the slope angle of the bottom structure is no longer aligned with the slope angle of the target surface (e.g., a pitch angle is artificially introduced). Alternatively, retention tab 406 might optionally engage with a top edge of cornhole board hole 408 (not depicted in FIG. 18, shown as edge 330 in FIG. 17). Since the rear edge of the cornhole board is substantially straight along its entire distance, when placed in this location, level 402 can accurately measure the slope angle and pitch angle of target surface 412 across the complete width of the cornhole board, as the bottom surface of level 402 will remain in contact with the target surface.

As shown in FIG. 18, hook 414 might be attached to a string 416 of predetermined length or a tape measure, and hook 414 might be attached to level 402, for example by a hook (e.g., hook 106 depicted in FIG. 1 or post 214 depicted in FIG. 9). Retention tab 406 engages with edge 410 to remain securely in contact with target surface 412 if string 416 is pulled tight to measure a distance (e.g., to measure to another cornhole board, as described in regard to FIG. 17). Referring again to FIG. 17, levels 304a and 304b are attached to respective cornhole boards 302a, 302b and pulled taught via string 306. In an implementation, the length of string 416 may vary to ensure that the desired distance (e.g., 27 feet apart from front to front, as shown by line 316) between cornhole boards 302a, 302b is maintained. In some implementations, line 316 may be more or less than 27 feet.

Some implementations may have top surface 203 (e.g., of FIG. 9) and bottom surface 226 (e.g., of FIG. 10) overhang one or more of side surfaces 216 and 220 such that ledges similar to ledges 212 and 222 are also formed above and below the side surfaces. In such implementations, string 306 may be wrapped around level 200 such that the string 306 is retained within the ledges and, thus, string 306 may be held in place when not in use for measurement as shown in FIG. 18. Since the side ledges and ledges 212 and/or 222 are similar, the ledges collectively may also be referred to herein as side retention ledges.

As shown in FIG. 19, a retention tab 506 might include a lip 517 to engage underneath a target surface 512. For example, retention tab 506 might have a depth sufficient to engage a target surface having a thickness anywhere between 1/64" and 1". Additionally or alternatively, retention tab 506 may have a textured front retention surface to grip or otherwise engage edge 510 of target surface 512. For example, the textured front retention surface may include rubber grips or otherwise have a rough, non-smooth, textured surface to facilitate better grip with an edge of the target surface.

In a manner as described above in regard to FIG. 18, retention tab 506 might optionally engage with edge 510 of cornhole board hole 508, as shown in FIG. 19. Alternatively, retention tab 506 might optionally engage with a top edge of target surface 512 (not shown in FIG. 19, shown as edge 330 in FIG. 17).

Although dimensions are not depicted in the figures and implementations of levels 100 and 200 may be implemented in a variety of dimensions, some implementations described herein may desirably have dimensions of approximately 2" to 3" in length along axis 111, and approximately 1" (front tapered end) to 2" (rear wider end) along axis 109. Retention tab 104 and 217 may have a depth along axis 125 of approximately 0.8" to 1.5". For example, in some implementations, levels 100 and 200 might be approximately 2.4" along axis 111 and be approximately 1.75" along axis 109 at the rear, wider point, and be approximately 0.75" along axis 109 at the front, narrower point (e.g., as shown in FIG. 9). Retention tabs 104 and 217 may be approximately 0.75" along axis 125 (e.g., as shown in FIG. 13) and may be disposed at an angle relative to top surface 210, for example approximately 45 degrees. In some implementations, ledges 212 and 222 and similar side ledges may have a thickness of approximately 0.08" to 0.1", such as 0.094".

While described herein as being used to level gaming surfaces such as cornhole boards, the described implementations are not so limited and may be used in a wide variety of applications. For example, some implementations may be used to level other surfaces where slope and pitch are desirably set to determined angles simultaneously, such as ramps, platforms, tables, equipment, and so forth. Additionally, tools such as grinders, sanders, saws, or lathes may desirably be simultaneously set to a determined slope angle and a determined pitch angle when creating angled, pitched, or beveled workpieces.

Although the term "hole" is used, the term "cavity" may also be used synonymously to describe a recess and/or empty space on the board.

Reference herein to "one implementation" or "an implementation" means that a particular feature, structure, or characteristic described in connection with the implementation can be included in at least one implementation of the claimed subject matter. The appearances of the phrase "in one implementation" in various places in the specification are not necessarily all referring to the same implementation, nor are separate or alternative implementations necessarily mutually exclusive of other implementations.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing various implementations and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

While the implementations are susceptible to various modifications and alternative forms, specific examples thereof have been shown in the drawings and are herein described in detail. It should be understood, however, that these implementations are not to be limited to the particular form disclosed, but to the contrary, these implementations are to cover all modifications, equivalents, and alternatives falling within the spirit of the disclosure. Furthermore, any features, functions, steps, or elements of the implementations may be recited in or added to the claims, as well as negative limitations that define the inventive scope of the claims by features, functions, steps, or elements that are not within that scope.

It will be further understood that various changes in the details, materials, and arrangements of the parts which have been described and illustrated in order to explain the nature of the described implementations might be made by those skilled in the art without departing from the scope of the following claims.

What is claimed is:

1. A level apparatus for measuring a level of a target surface, the apparatus comprising:
   a base structure having a bottom surface, a top surface, a rear surface, and a front surface; and
   at least one bubble level disposed on the top surface of the base structure,
   wherein the bottom surface is disposed at a predetermined slope angle along a first axis of the base structure, the predetermined slope angle associated with a desired slope angle of the target surface along the first axis, such that in response to the target surface being disposed at the predetermined slope angle, the top surface of the base structure is substantially level along the first axis,
   wherein the bottom surface is disposed at a predetermined pitch angle along a second axis of the base structure, the second axis perpendicular to the first axis, such that in response to the target surface being disposed at a predetermined pitch angle, the top surface of the base structure is substantially level along the second axis,
   wherein the at least one bubble level is disposed on the top surface along the first axis to indicate a slope level of the target surface relative to the predetermined slope angle and along the second axis to indicate a pitch level of the target surface relative to the predetermined pitch angle,
   wherein the base structure has a retention member disposed proximate to the rear surface and extending from the bottom surface in retention engagement direction along a third axis, the third axis perpendicular to the first axis and the second axis, the retention member configured to hold the level apparatus in place in relation to the first axis, wherein the target surface is a gaming surface of a cornhole board, wherein the retention member is configured to engage along at least one of: a rear edge of the gaming surface of the cornhole board and a front edge of a hole of the cornhole board, and wherein the retention member is disposed at a retention angle relative to the top surface.

2. The level apparatus of claim 1, wherein the at least one bubble level comprises a first bubble tube disposed along the first axis, and a second bubble tube disposed along the second axis.

3. The level apparatus of claim 1, wherein the at least one bubble level comprises a bullseye bubble level.

4. The level apparatus of claim 1, wherein the predetermined slope angle is a 10 degree down angle of the bottom surface from the rear surface to the front surface.

5. The level apparatus of claim 1, wherein the predetermined pitch angle is 0 degrees.

6. The level apparatus of claim 1, wherein the predetermined slope angle and the predetermined pitch angle are adjustable on the level apparatus.

7. The level apparatus of claim 1, wherein the top surface comprises one or more reception areas.

8. The level apparatus of claim 1, wherein the base structure further comprises an engagement member disposed proximate to the front surface, the engagement member configured to engage an end of a string to measure a predetermined distance from the front surface.

9. The level apparatus of claim 8, wherein the string is configured to measure a predetermined horizontal distance from the front surface.

10. The level apparatus of claim 9, wherein the predetermined horizontal distance is substantially 27 feet.

11. The level apparatus of claim 8, wherein the string is of pre-determined length to measure a predetermined length of a horizontal distance from the front surface.

12. The level apparatus of claim 8, wherein the top surface and the bottom surface overhang one or more side surfaces of the level apparatus, thereby forming one or more side retention ledges, the one or more side retention ledges configured to receive and hold the string in place in response to the string not being in use.

13. A level system for measuring a level of a first target surface and a second target surface, the level system comprising:

a first level apparatus and a second level apparatus;

wherein the first level apparatus and the second level apparatus each comprise:

a base structure having a bottom surface, a top surface, a rear surface, and a front surface;

at least one bubble level disposed on the top surface of the base structure; and an engagement member disposed proximate to the front surface, the engagement member configured to engage an end of a string to measure a predetermined distance from the front surface, wherein the bottom surface is disposed at a predetermined slope angle along a first axis of the base structure, the predetermined slope angle associated with a desired slope angle of the target surface along the first axis, such that in response to the target surface being disposed at the predetermined slope angle, the top surface of the base structure is substantially level along the first axis, wherein the bottom surface is disposed at a predetermined pitch angle along a second axis of the base structure, the second axis perpendicular to the first axis, such that in response to the target surface being disposed at a predetermined pitch angle, the top surface of the base structure is substantially level along the second axis, wherein the at least one bubble level is disposed on the top surface along the first axis to indicate a slope level of the target surface relative to the predetermined slope angle and along the second axis to indicate a pitch level of the target surface relative to the predetermined pitch angle, wherein the base structure has a retention member disposed proximate to the rear surface and extending from the bottom surface in retention engagement direction along a third axis, the third axis perpendicular to the first axis and the second axis, the retention member configured to hold the level apparatus in place in relation to the first axis, and wherein the string is attached to engagement member of the first level apparatus and the engagement member of the second level apparatus to measure a distance along a horizontal axis between the first level apparatus and the second level apparatus, wherein the predetermined slope angle is a 10 degree down angle, wherein the predetermined pitch angle is 0 degrees, and wherein the distance along the horizontal axis is substantially equal to 27 feet.

14. A level system for measuring a level of a first target surface and a second target surface, the level system comprising:

a first level apparatus and a second level apparatus;

wherein the first level apparatus and the second level apparatus each comprise:

a base structure having a bottom surface, a top surface, a rear surface, and a front surface;

at least one bubble level disposed on the top surface of the base structure; and an engagement member disposed proximate to the front surface, the engagement member configured to engage an end of a string to measure a predetermined distance from the front surface, wherein the bottom surface is disposed at a predetermined slope angle along a first axis of the base structure, the predetermined slope angle associated with a desired slope angle of the target surface along the first axis, such that in response to the target surface being disposed at the predetermined slope angle, the top surface of the base structure is substantially level along the first axis, wherein the bottom surface is disposed at a predetermined pitch angle along a second axis of the base structure, the second axis perpendicular to the first axis, such that in response to the target surface being disposed at a predetermined pitch angle, the top surface of the base structure is substantially level along the second axis, wherein the at least one bubble level is disposed on the top surface along the first axis to indicate a slope level of the target surface relative to the predetermined slope angle and along the second axis to indicate a pitch level of the target surface relative to the predetermined pitch angle, wherein the base structure has a retention member disposed proximate to the rear surface and extending from the bottom surface in retention engagement direction along a third axis, the third axis perpendicular to the first axis and the second axis, the retention member configured to hold the level apparatus in place in relation to the first axis, and wherein the string is attached to engagement member of the first level apparatus and the engagement member of the second level apparatus to measure a distance along a horizontal axis between the first level apparatus and the second level apparatus, wherein the target surface of the first level apparatus is a gaming surface of a first cornhole board and the target surface of the second level apparatus is a gaming surface of a second cornhole board, and wherein the distance along the horizontal axis is a distance between the first cornhole board and the second cornhole board.

\* \* \* \* \*